Nov. 24, 1970     C. F. BOESTER     3,543,294
HOUSEHOLD WATER CONSERVATION SYSTEM
Filed April 21, 1969
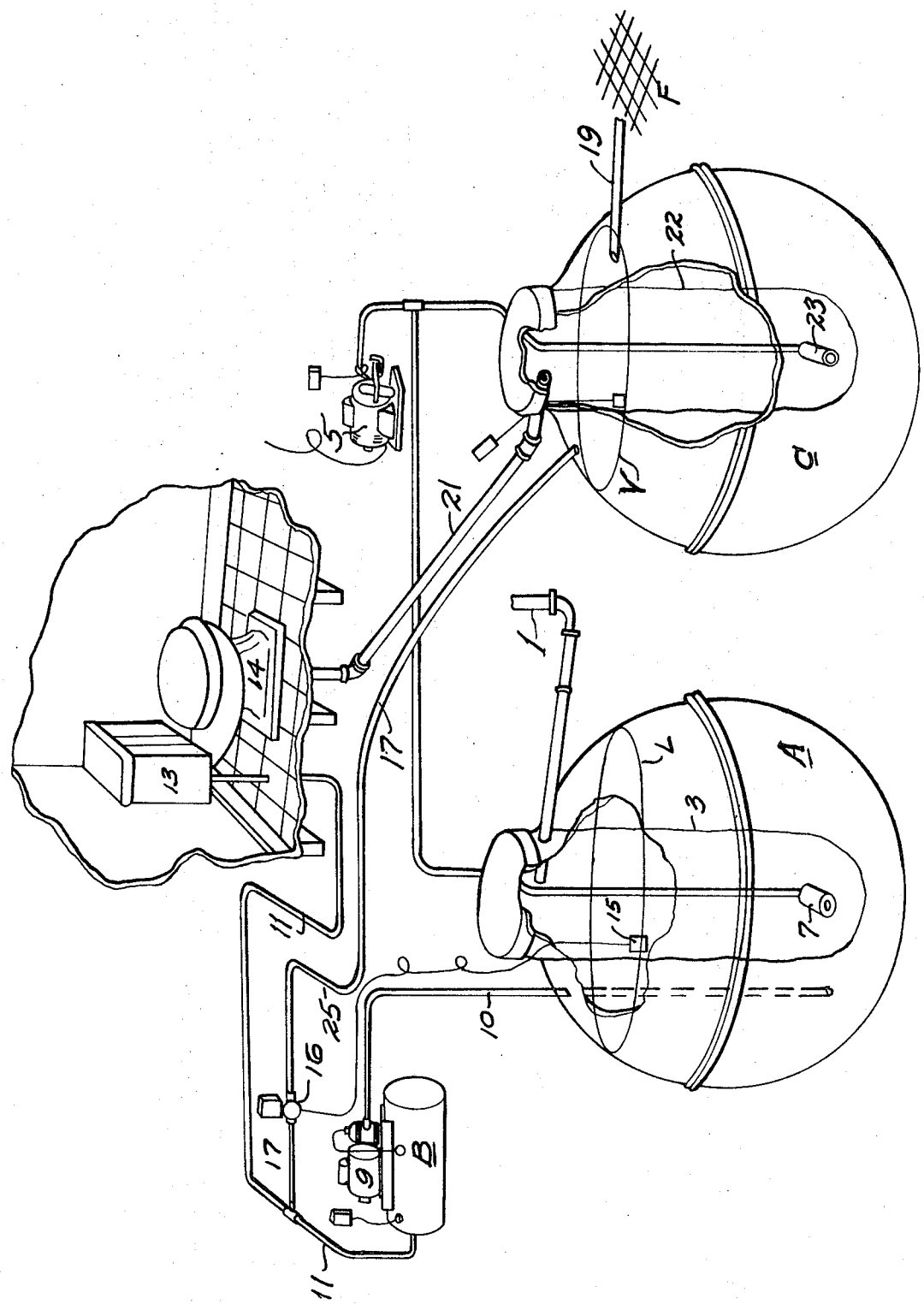
Inventor
Carl F Boester
By Bedell & Burgess
Attys.

United States Patent Office 3,543,294
Patented Nov. 24, 1970

3,543,294
HOUSEHOLD WATER CONSERVATION SYSTEM
Carl F. Boester, Arlington, Va.
(P.O. Box 567, Lafayette, Ind. 47902)
Filed Apr. 21, 1969, Ser. No. 817,833
Int. Cl. C02c 1/00
U.S. Cl. 210—15
6 Claims

ABSTRACT OF THE DISCLOSURE

Household water conservation method and apparatus comprising the collecting of household waste water, other than toilet discharge water; treating it as by aeration and filtering, and supplying the treated water for all household toilet flushing; treating the water flushed from the toilets, as by aeration, filtering and aerobic processes; and discharging the resulting effluent direct to a suitable disposal field, or above-grade discharge, all without use of a septic tank or connection to a sewer system.

BACKGROUND OF THE INVENTION

It is estimated that approximately 50% of the usual total water consumed by a household is used in the toilets. The main object of this invention is to reduce or eliminate the necessity of the demand for new water from supply mains with each use of the toilet, as is customary, by obtaining the toilet flushing water solely from the waste water discharged from the bath, wash basins, laundry and kitchen and to treat the toilet flushing liquid so that it may be discharged into an inexpensive drain field, with accompanying savings in building structure and water consumption. My copending application Ser. No. 627,725 filed Apr. 3, 1967, now U.S. Pat. Number 3,440,669, disclosed that repeated recirculation and commingling and treatment of similar toilet flushing water, with or without bath and kitchen waste water, but requires extended treatment of all the water used, which is unnecessary with the present system and apparatus. Since the volume of liquid circulated in the system is 50% less than the volume in the usual household-septic tank system, the disposal field need be only half the capacity required for the usual septic tank-tile disposal field and it may be even less than 50% because the discharged liquid is a stable odor-free and solids-free effluent.

DESCRIPTION OF THE PREFERRED EMBODIMENT

The drawing, which is mainly diagrammatic, shows a drain pipe 1 through which household waste water, other than toilet flushing water, is conducted to a bag-like filter 3, comprising one or more layers of fibrous material. The filter is contained within a tank A, of approximately 300 gallons capacity for example, which serves as a storage receptacle for water passing through the filter. Preferably a continuously running air compressor 5 aerates the water in the filter bag through a diffuser 7 in the lower part of the bag.

A motor-driven pump 9 draws water through pipe 10 to a reservoir B where it is maintained under pressure of approximately thirty pounds per square inch and is conducted through pipe 11 to one or more household toilet flush boxes and bowls as indicated at 13 and 14, each box being provided with the usual float controlled shut-off valve, not shown. Normally when water in tank A rises to level L it will actuate a sensor 15 to open an electric valve 16 and bypass water from pipe 11 through piping 17 direct to a tank C, similar to tank A. When water in tank C reaches level V it may flow by gravity through a discharge pipe 19 to a disposal field F such as formed by subsurface tile.

The toilet sewage is flushed from bowl 14 through drain 21 into a filter bag 22 in tank C, similar to filter 3 in tank A, and the contents of bag 22 are aerobically processed, being aerated by another diffuser 23 supplied by compressor 5. The liquid is filtered through the bag and bacterial slimes on the inside surface of the bag and emerges as a stable effluent discharged at 19. It is not recirculated, as has characterized some earlier household systems.

Ordinarily tanks A and C will be buried in the ground adjacent the house and may be connected to other water equipment within the house by suitable piping. While the present system and apparatus may utilize various filter structure and other arrangements of known household water-reclaiming systems, it also includes the new feature of circulating nonsewage waste water only, involving additions to or changes in earlier arrangements. It avoids recirculation of toilet effluent but does not involve use of the large quantity of fresh water as is required for the usual household sewage disposal. In the unlikely event of repeated flushing of the toilet while there is no bath, kitchen sink or wash basin waste, a faucet in one of these sources of supply to bag 22 may be opened temporarily.

My claims are:

1. The method of conserving household water consumption comprising the collection of waste water from household bath, wash basins, laundry and kitchen sink, exclusive of toilet bowl discharges, passing said waste water through a filter into a storage receptacle, flushing household toilet bowls with water from said receptacle, aerating the discharge from the toilet bowls, independently of said first-mentioned waste water, and disposing the resulting aerated effluent direct to a suitable field.

2. The method of conserving household water consumption as described in claim 1 which includes aerobically treating the filtered and aerated toilet discharge before conducting it to the disposal field.

3. A household water conservation system comprising a filter device, piping for conducting waste water from the household bath, wash basins, laundry and kitchen sink, but not the waste from the household toilet bowls, to said filter device, means for supplying air to water in said device, piping for conducting the aerated water to said toilet bowls, a receptacle for sewage discharged from said toilet bowls, said means also supplying air to aerate the contents of said receptacle, and an outlet from said receptacle for discharging its overflow from the system independently of said piping.

4. A household water conservation system is described in claim 3 in which the filter device and receptacles are buried in the ground and a disposal field is provided adjacent the buried parts.

5. A household water conservation system comprising a filter device, a conduit for leading waste water from the household bath, wash basins, laundry and kitchen sink, but not the waste from the household toilet bowls, to said device, means for aerating water passing through said device, piping for conducting the aerated water to household toilet bowls, a receptacle for sewage discharged from said bowls, said means also supplying air to said receptacle, and a disposal field receiving the overflow of said receptacle.

6. A household water conservation system as described in claim 5 in which a tank encloses the first-mentioned filter device and receives the water from the latter, a pump supplying the household toilet bowls with water from said tank for flushing said equipment, an electric device actuated by pressure in said tank for controlling said pump, there being air compressor mechanism with air discharging members within each of said tanks.

References Cited
UNITED STATES PATENTS

| | | | |
|---|---|---|---|
| 2,798,228 | 7/1957 | Boester | 210—60 X |
| 2,858,939 | 11/1958 | Corliss | 210—60 X |
| 2,974,800 | 3/1961 | Fleischmann | 210—16 X |

MICHAEL ROGERS, Primary Examiner

U.S. Cl. XR.

4—10; 210—60, 116, 170, 220